US00RE37001E

United States Patent [19]

Morganstein et al.

[11] E Patent Number: Re. 37,001

[45] Reissued Date of Patent: Dec. 26, 2000

[54] INTERACTIVE CALL PROCESSOR TO FACILITATE COMPLETION OF QUEUED CALLS

[75] Inventors: Sanford J. Morganstein, West Dundee; Herbert B. Krakau, Elmhurst; Bakulesh A. Mehta, Downers Grove; Mark D. Klecka, De Kalb, all of Ill.; Robert Carleton, La Paz B.C.S., The Former Yugoslav Republic of Macedonia

[73] Assignee: Aspect Telecommunications Inc., San Jose, Calif.

[21] Appl. No.: 08/709,133

[22] Filed: Sep. 6, 1996

Related U.S. Patent Documents

Reissue of:

[64] Patent No.: 5,166,974
Issued: Nov. 24, 1992
Appl. No.: 07/685,543
Filed: Apr. 15, 1991

U.S. Applications:

[63] Continuation of application No. 08/344,752, Nov. 23, 1994, abandoned, which is a continuation of application No. 07/272,091, Nov. 16, 1988, Pat. No. 5,020,095.

[51] Int. Cl.[7] ..... H04M 3/50

[52] U.S. Cl. ..... 379/67; 329/88; 329/89

[58] Field of Search ..... 379/67, 88, 89, 379/211, 212, 213, 214, 233, 265, 266, 309

[56] References Cited

U.S. PATENT DOCUMENTS

| | | | |
|---|---|---|---|
| 4,694,483 | 9/1987 | Cheung | 379/34 |
| 4,696,028 | 9/1987 | Morganstein et al. | 379/88 |
| 4,763,353 | 8/1988 | Canale et al. | 379/157 |
| 4,788,715 | 11/1988 | Lee | 379/84 |
| 4,797,911 | 1/1989 | Szlam et al. | 379/67 |
| 4,809,321 | 2/1989 | Morganstein et al. | 379/211 |
| 4,893,328 | 1/1990 | Peacock | 379/67 |

FOREIGN PATENT DOCUMENTS

| | | | |
|---|---|---|---|
| 0096447 | 6/1983 | European Pat. Off. | 379/211 |

*Primary Examiner*—Fans S. Tsang
*Attorney, Agent, or Firm*—Snell & Wilmer L.L.P.

[57] ABSTRACT

Call processing apparatus for queuing calling parties waiting to be connected to a service position, and for calculating queue position data or wait time data and transmitting the queue data to the calling parties. The queued calling parties can also reach alternate destinations by inputting digit information for routing queued calling parties to such destinations.

12 Claims, 4 Drawing Sheets

INTERACTIVE CALL PROCESSOR TO FACILITATE COMPLETION OF QUEUED CALLS

Matter enclosed in heavy brackets [ ] appears in the original patent but forms no part of this reissue specification; matter printed in italics indicates the additions made by reissue.

This is a continuation of *U.S. application Ser. No. 08/344,752, filed Nov. 23, 1994, now abandoned, which is a continuation of* U.S. Pat. application Ser. No. 272,091 filed Nov. 16, 1988, now U.S. Pat. No. 5,020,095.

TECHNICAL FIELD OF THE INVENTION

The present invention relates in general to telecommunications equipment, and more particularly to automatic call distributors and associated methods and apparatus for enhancing the completion of calls to service positions.

BACKGROUND OF THE INVENTION

Automatic call distributors are employed in high telephone call traffic situations for providing an even and systematic distribution of incoming calls to a plurality of service positions, such as operators, attendants or agents. Less sophisticated call sequencers are also used in high traffic situations, but provide only "first in first out" queuing for the callers. Generally, such sequencers do not provide uniform distribution of calls to the attendants or agents. One typical applications for automatic call distributor (ACD) equipment is the airline industry, in which a large number of callers seeking reservation, arrival, departure, etc., information are connected in an orderly manner to a number of attendants. More typically, ACD equipment provides incoming calls [With] *with* a direct connection to available attendants until all such attendants are busy. Thereafter, calling parties are placed in a queue, and depending on the service algorithm employed, the calling parties are selectively connected to an operator, once such a position becomes available. Conventional automatic call distribution equipment and methods are disclosed in U.S. Pat. No. 3,111,561.

While ACD equipment has been widely accepted for servicing such high traffic situations several shortcomings exist. First, the calling parties placed in the queue must wait to be serviced without knowing the extent of the wait time or other circumstances involved. Hence, many calling parties placed in the queue become impatient and simply discontinue the call by hanging up, whereby the business entity associated with the ACD may lose business or customers. In addition, the same calling parties may place subsequent and repeated telephone calls to the business, thereby generating a number of calls from a single caller which yields an erroneous indication of the number of inquiries made to the business entity.

A related concern with present Private Branch Exchange (PBX) equipment, when used to handle large incoming volumes of traffic, is that which is commonly known as "queue limitation." This limitation is encountered when all incoming lines of the business entity are tied up with callers waiting for a group of positions which are experiencing long delays, thereby making access impossible to free or idle telephone extensions which are situated outside of the high traffic group. Such a situation hampers good business relationships and often has a negative affect on the calling parties.

It can be seen that a need exists for instructing the queued calling parties of alternate destinations which may be better suited for providing assistance, and instructions as to the manner in which to reach such destinations. A further need exists for enhancements to ACD and PBX equipment for informing calling parties which have been queued and are therefore waiting for service, of their relative position within the queue so that they are aware of their advancement in the queue and that the completion of the call is imminent.

SUMMARY OF THE INVENTION

In accordance with the invention, there is provided a call processor for use with telephone switching equipment for enhancing and facilitating the completion of calls thereto. According to the call processor of the invention, calling parties who cannot be presently serviced by the attendant positions of telephone switching equipment are periodically transmitted a message concerning queue information. The message may include information concerning the average time in which queued calls are answered, or the calling party's relative position within the queue. The call processor of the invention calculates delay spectra information based on the recent history of complemented telephone calls to the attendant positions. The information related to the delay spectra can then be transmitted to the calling parties to generate a well-being and confidence that progress is being made in completing the call.

Provided also may be alternate destinations other the attendant positions to which calling parties may be connected. For example, calling parties may optionally be connected, by their choice, to specialized attendants for answering specific inquiries, to voice store and forward facilities, or to general switchboard positions. The calling parties are informed, via an instructional message, of such alternate destinations and the digit information to input for connection to the desired destination.

In order to eliminate the queue limitation problem, there is established a queue threshold for holding a maximum number of calling parties waiting to be connected to the attendant positions. Calling parties placing incoming calls to the switching equipment which exceed the threshold are transmitted a different instructional message concerning an overflow situation. The calling parties may then be given an alternate set of choices, and further holding would not be one of the choices, or the parties are disconnected. This is especially advantageous in telephone switching systems for providing alternate service to the callers, or for releasing incoming lines and allowing other incoming traffic to be serviced as to other inquiries which may not lead to an overload condition.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same parts or functions throughout the views, and in which.

DETAILED DESCRIPTION OF THE INVENTION

Figure 1:
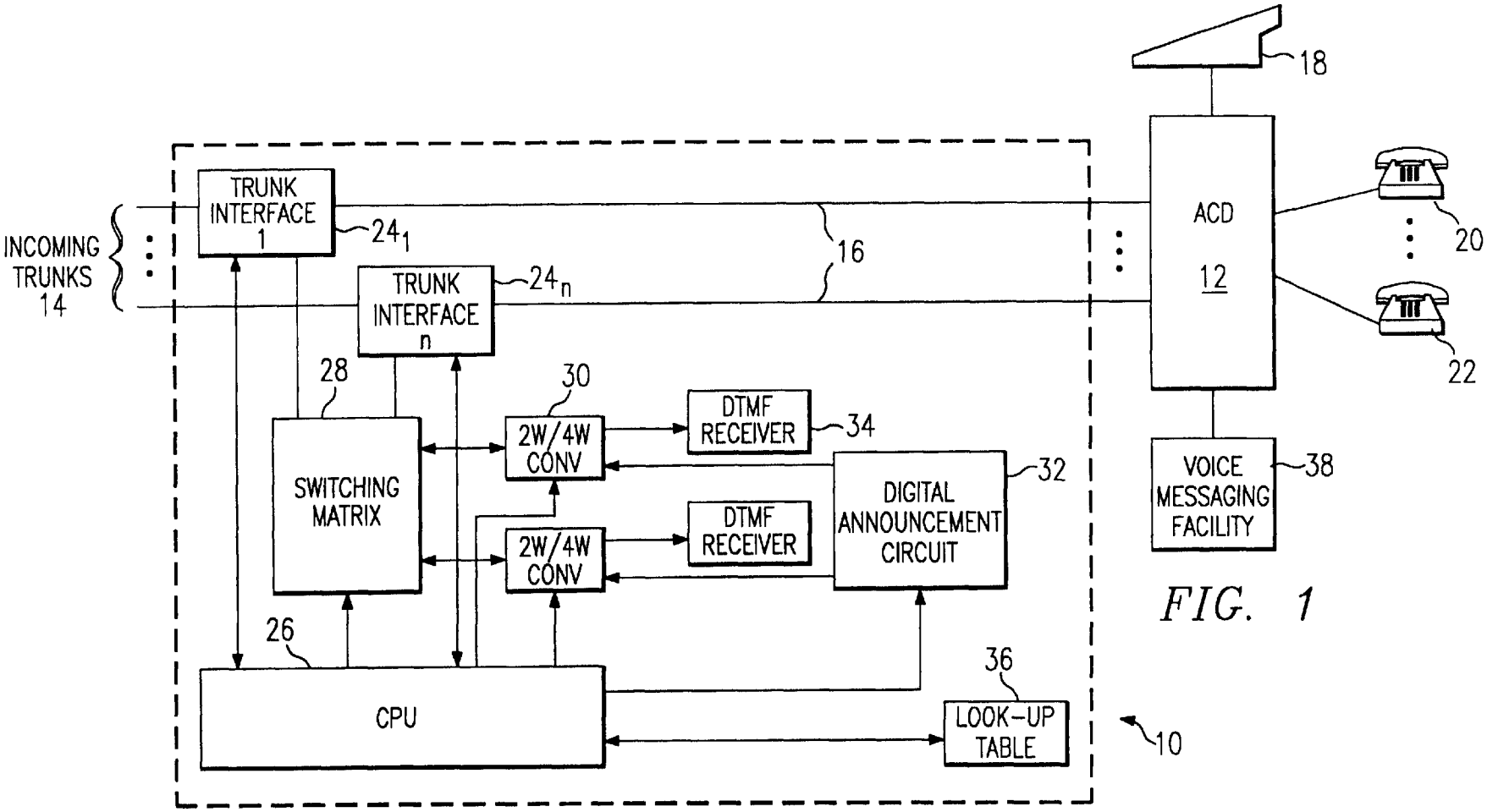
FIG. 1 is a block diagram of an environment in which the call processor of the invention may be advantageously practiced.

With reference first to FIG. 1, there is illustrated an environment in which the preferred form of the invention may be advantageously practiced. Depicted is a call processor 10 connected to a telephone switching system 12 for facilitating the completion of calls thereto. More particularly, shown is a call processor 10 which functions to complete telephone calls from local central offices (not shown) to the telephone switching system 12. Those skilled in the art may find that the call processor 10 can be adapted to function in cooperation with the telephone switching system 12 without direct external connection thereto, and may even be functionally integrated within other similar types of switching systems.

The call processor 10 is shown connected on inputs thereof to one or more incoming trunks 14, and connected on outputs thereof to the telephone switching system 12 by a corresponding number of subscriber lines 16. In the preferred form of the invention, incoming calls from central offices are therefore directed to the telephone switching system 12, via the call processor 10 of the invention. The telephone switching system 12 may be of the unattended type, or be provided with a switchboard attendant 18.

The call processor 10 of the invention may alternatively be connected to the telephone switching system 12 primarily by way of the subscriber lines 16, with the incoming trunks 14 remaining connected to corresponding incoming trunk circuits of the telephone switching system 12. With such an alternate arrangement, the switching system 12 would be programmed to route all incoming trunk calls to the call processor 10, which would then process such calls according to the detailed description below, and transfer the processed call back to the switching system 12 by conventional hook-flash signalling. In response to the hook-flash signalling, the switching system 12 would then connect the incoming call to the appropriate telephone set.

The illustrated telephone switching system 12 also serves a number of telephone sets or service attendant positions 20 and 22. Typical applications require anywhere from about three to several hundred service attendant positions for servicing incoming calls. Conventional calls are directed to the telephone switching system 12 by way of the preferred form of the call processor 10 in the following manner. In response to an incoming call from calling parties (not shown), ringing signals are transmitted on the incoming trunks 14 to a trunk interface in the call processor 10. The number of trunk interfaces depends on the number of incoming trunks 14 and the traffic parameters of the telephone switching system 12. A CPU 26, which is connected to the plural trunk interfaces, detects the ringing signals and connects the particular trunk interface 24, via a switching matrix 28, to an idle two-wire to four-wire converter 30, commonly known as a hybrid. The CPU 26 is also effective to select a greeting message in a digital announcement circuit 32 for transmittal through the hybrid 30, the switching matrix 28, the trunk interface 24, and to the calling party. Of course, the CPU 26 also trips the incoming ringing so that the calling party can listen to the greeting message.

In response to the greeting, the calling party is instructed to input the telephone extension number associated with the type of service or information required. The input of the extension number digits from the caller's DTMF-type telephone set is decoded by a DTMF receiver 34 and temporarily stored in the CPU 26 in digital form. One or more look-up tables 36 are employed by the CPU 26 for cross-referencing purposes, the details of which are described below. The CPU 26 then provides an off-hook condition to one of the subscriber lines 16 connected to the trunk interface 24. The telephone switching system 12 responds to such off-hook condition by sending a dial tone on the subscriber line 16, whereupon the CPU 26 outpulses the stored digits in DTMF form to the telephone switching system 12. The telephone switching system 12 then effects a connected between the subscriber line 16 and the selected service position set 20 or 22. In like manner, the CPU 26 of the call processor 10 provides a cut-through in the trunk interface 24 between the incoming trunk 14 and the subscriber line 16, thereby providing an overall communication path between the calling party and the service position 20 or 22. The structure and functional operation of a similar call processor is described in more detail in U.S. Pat. No. 4,696,028, by Morganstein et al., the subject matter of which is incorporated in its entirety herein by reference.

To be described in more detail below, the present invention allows a calling party to respond to a voice prompt generated by the call processor 10 to input digits, and be connected to various alternate destinations, such as a telephone extension set of the telephone switching system 12, or a voice store and forward messaging facility 38. Voice store and forward facilities may be employed, such as the type disclosed in U.S. Pat. No. 3,931,476, by Matthews. Of course, many other destinations or alternate facilities may be employed for routing the incoming calls thereto.

Having described the apparatus of the preferred form of the invention, reference is now made to FIGS. 2a–2f which depict the functional operation of the call processor 10 to achieve the features and advantages of the invention. Program flow block 40 illustrates a call processing routine in which new originating calls are detected by the trunk interface circuits 24. In the preferred form of the invention, new incoming calls are detected by sensing ringing signals by the CPU 26 at the trunk interface 24. This is noted by program block 42. Once a call origination is detected by the trunk interface 24, ringing is tripped, and a message is selected from the announcement circuit 32 and transmitted to the calling party, as shown by program block 44. The message preferably informs the calling party as to the general destination reached, and instructions concerning reaching a particular destination or facility. The CPU 26 may also select from among several different messages, the application of which may depend on the trunk interface 24 on which the call arrived, and the time of day and other appropriate factors.

For airline reservation use, for example, the message may be, "This is Apex Air lines, for reservations dial '1', for departure information dial '2', for arrival information dial '3', for baggage information dial '4', for customer service dial '5'." Depending on the destination desired by the calling party, the relative digit information is input, whereupon the call processor 10 proceeds to decision block 46. Here, the call processor 10 determines, based on the digits input by the calling party, whether to transfer the call to the telephone switching system 12 in the manner disclosed in U.S. Pat. No. 4,696,028. The subject matter of the noted patent is incorporated herein by reference. If so, program control is branched to block 48 where digits are output to the telephone switching system for connection to the desired destination. If, on the other hand, the call is treated as an interactive call distribution call, program control branches to block 50 where the destination information is dispatched to the telephone switching system 12, and the CPU 26 is conditioned to perform the interactive call distribution function.

Continuing with program decision block 52, the CPU 26 determines whether the called destination is busy, and if not, control is branched to program flow block 54. The busy status of the called destination is sensed by detecting the conventional busy signal. Ringing signals can also be used as an indication of a busy signal by the invention, as some telephone switching systems, which also queue calls to busy extensions may not return a conventional busy signal. Other signals, such as the reversal of battery on the line connecting the switching system to the call processor may be utilized as an indication that the destination is busy. On an affirmative decision of block 52, program control branches to block 56. With reference back to program flow block 54, another decision is encountered, in which it is determined whether or not the called destination answers within a preset period of time. If the destination selected by the calling party answers within the preset period of time, control branches to block 58 where an average answer time is calculated for the last three calls, including the instant call. The preset time period utilized in block 54 may be arbitrary, but is related to a time period in which calling parties are not generally irritated by a no-answer situation. For example, the time period may be preset for 10–15 seconds. A software timer can be utilized for the timer. The timer is reset at the initiation of ringing the called destination. Before the lapse of such time period if there is an answer, the microprocessor of the CPU 26 is interrupted for branching to block 58. In branching from block 54 to block 58 for each call processed by the call processor 10, statistics are maintained for storing the precise time in which each call is answered.

According to block 58, a running average is maintained for the average call answer time. Such a time period represents an index to the look-up table 36 for accessing a particular message in the digital announcement circuit 32. Stored in the digital announcement circuit 32 are digitized voice announcements concerning voiced times with predetermined increments. For example, indexes can be utilized for accessing the digital announcement circuit 32 to access the contents which, when converted to analog form, represent the voiced phrase "five seconds", "six seconds", "seven seconds", . . . . Such voiced time periods are utilized later in informing the calling party during busy situations of the average wait time before it can be expected to be connected to one of the attendant positions 20–22. From program block 58, processor control returns to main processing where new call originations are detected, or to conventional service routines. This is shown by program flow block 60.

Returning to program block 52, if a dialed destination is busy, or if the called destination does not answer within the preset period of time, as noted by block 54, program flow branches [&o] *to* block 56. When an incoming call remains unanswered for the preset period time, it is placed in a queue (block 56) and the number of calls in the queue proceeding the instant call is determined. The queueing of telephone calls in the call processor 10 is arranged and maintained in a conventional manner, well known according to ACD techniques. From block 56, the program flow -proceeds to block 62 where it is determined whether the number of incoming calls which remain unanswered is greater than a preset limit. While not shown, those skilled in the art will readily realize that the queue can be entered, via block 62, by routes other than from block 56. As one example, a calling party may be placed in the queue after a predetermined time parameter is exceeded, such as waiting for a response or servicing by the system.

The queue limitation disadvantage noted above is obviated by an affirmative processor decision according to block 62. In such case, control is branched to block 64 (FIG. 2b) where a message is transmitted to the calling party concerning a full queue. If a full queue message is not to be transmitted to the calling party, the calling party is promptly disconnected 66 and processing returns to other routines for detecting new incoming calls or to service routines such as indicated by block 69. If a full queue message is to be played, as shown by block 68, such message is retrieved from the digital announcement circuit 32 and transmitted to the calling party. The message content may be in the nature of "We are unable to connect you to our reservations personnel right now, but we will connect you to our voice store and forward facilities if you dial '1', our customer service if you dial '2', or to our operator assistance if you dial '3' . . . " The message can continue as to other optional destinations. Such alternate destinations may be other specified queues, other specified individuals, other organizations which may assist the caller, etc. A selection of another queue is carried out by the call processor 10 by entering another call processing routine which coordinates the call processing steps associated with the other queue. In the event one of the destinations satisfies the desired of the calling party, the corresponding digit information input by the calling party is received 70, and the call is processed based on the destination selected 72 by the calling party. On the other hand, if no digit information is input by the calling party, a default destination is selected 74, such as the operator assistance 18. The default destination, programmed according to block 74 can be one of a variety of destinations which also can be reached by a caller selection based on the result of program block 72. In any event, if the digits input by the calling party, or the default destination is programmed for connection to the voice store and forward facility 38, program flow branched to a routine 76 for accessing a voice store and forward facility 38. If an alternate destination is input by the calling party, or is identified as a default destination, program flow branches back to block 46 for processing in accordance with the program flow described above. In order to connect the calling party to an operator assistant 18, the telephone number associated therewith is retrieved 78 and outpulsed to the telephone switching system 12. The telephone switching system 12 receives such number and provides a talking path between the operator assistant 18 and the outgoing subscriber line 16 on which the extension number was outpulsed.

If the destination determined by either of the program flow blocks 72 or 74 denotes a voice store and forward facility 38, the telephone number associated therewith is retrieved and outpulsed to the telephone switching system 12. This step is illustrated in access routine 76 as block 80 (FIG. 2c). If no answer is detected from the voice store and forward facility 38, as noted by block 82, the telephone number of the facility is outpulsed again in an attempt to again access such facility. On the other hand, if the voice messaging facility 38 responds, the pertinent mailbox number if outpulsed 84 to the voice messaging facility 38. Importantly, the mailbox number associated with the destination initially input by the calling party is outpulsed 84 to the telephone switching system 12. In addition, digit information is transmitted to the telephone switching system 12 to place the voice messaging facility 38 in a recording mode, as shown by program flow block 86. The calling party is then connected 88 to the voice messaging facility 38, and the call processor 10 is returned to the call processing routine. Further details as to accessing the voice messaging facility, as depicted by routine 76, are described in U.S. Pat. No. 5,099,509 entitled "Integration of Voice Store and Forward Facility", assigned to Dytel Corporation. The disclosure of such patent is incorporated herein by reference thereto.

Figure 2A:
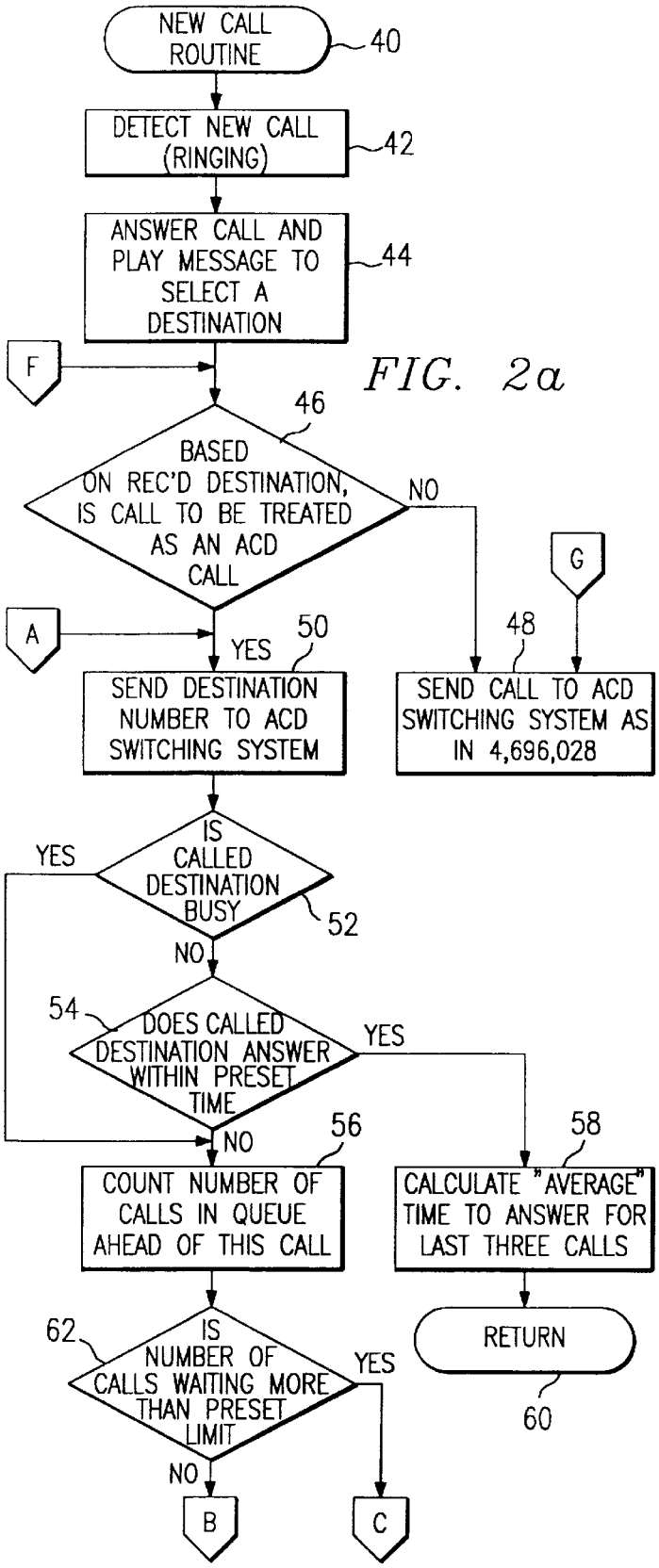
FIGS. 2a–2f are software flow charts illustrating the major functions carried out by the call processor of the invention in providing the automatic call distribution enhancements.
Figure 2C:
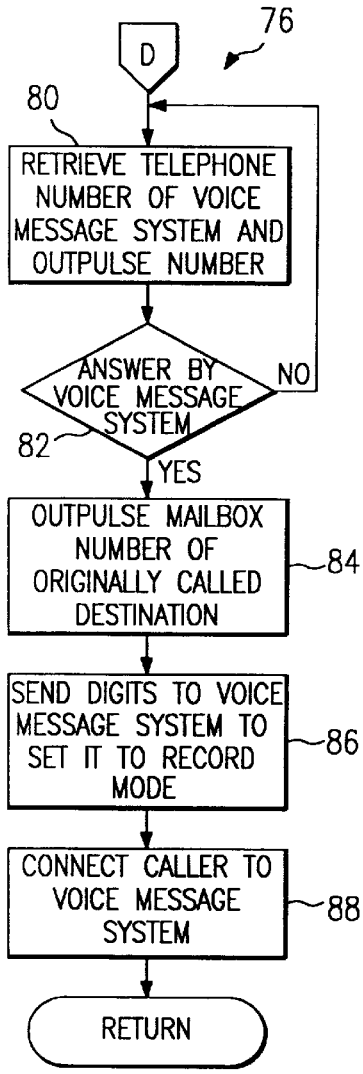

With reference back to program flow block 62 of FIG. 2a, a branch is made to block 90 (FIG. 2d) is the number of waiting calls is less than the preset limit. In such instance, the call processor 10 determines whether a message is to be transmitted to the calling party concerning either the number of calls in the queue or the average answer time. In accordance with the spectra data maintained according to program flow block 56 and 58, both such delay spectra information is available. The decision as to the call processing route to take in accordance with the block 90 can be preprogrammed in advance. For example, a check bit programmed to a "0" by a programmer or installer of the call processor 10 may signify that the message transmitted to the calling party pursuant to block 90 is the delay spectral data concerning the number of calls in the queue. On the other hand, the programming of such check bit to a digital "1" may indicate that the route taken from block 90 causes a message transmission to the calling party concerning the average answer time.

Assuming for purposes of example, that the call processor 10 has been programmed for transmission of the number of calls in queue, a message is retrieved 92 from the digital announcement circuit 32, as cross-referenced by the actual number of the calls in the queue calculated according to block 56. In other words, a number, such as 14, is calculated in program flow block 56 as to the number of calling parties in the queue. Such calculation can be utilized for use in cross-referencing the look-up table 36 to find a voice message pre-stored in the digital announcement circuit 32 for transmitting 94 the text, "You are the fourteenth person in line for service, please stand by." Of course, a calculated queue number of "5" would result in the cross-referencing and retrieval of a message indicating that the person is the fifth in line for connection to an attendant position 20–22.

Proceeding with the example, the message retrieved from the digital announcement circuit 32 is transmitted to the calling party. In addition, appended to the queue location number if a voice message transmitted concerning the connection to various other destinations. The appended message may be in the nature of an instruction to input a first digit for connection to the voice messaging facility 38, a second digit for being placed on hold, a third digit for disconnection, a fourth digit for connection to another destination, a fifth digit for connection to operator assistance 18, or a sixth digit for connection to prerecorded marketing or advertising messages. Options and messages other than those shown can be provided. In the event that the sixth option is elected by the calling party, the call processor 10 waits while the advertising message, or messages, are played, to detect the input of digit information by the calling party as to the election of options one to five. If no other options are selected during the advertising message, the call is disconnected. If no digit information is received at all from the calling party according to block 96, call processing is routed to block 97 for accessing a predetermined default destination. While a queued calling party has selected and is listening to the message selected pursuant to the input of the sixth digit, the call processor maintains the queued calling party in respective position in the queue.

Figure 2E:
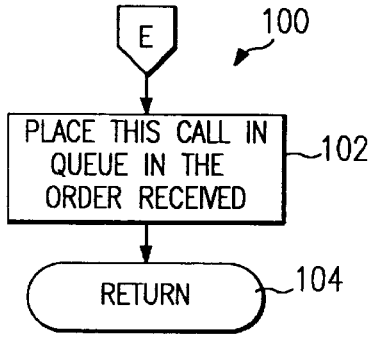

However, on the input 96 of digit information by the calling party, program flow branches to block 98 where call routing is carried out by the call processor 10 based on the digit information input by the calling party. If digit information input corresponds to the connection to a voice messaging facility 38, program flow branches to routine 76, as described above. On the other hand, if the calling party inputs digit information for being placed on hold, the call processor 10 is directed to a call holding routine 100 (FIG. 2e). The call holding routine 100 is executed by placing the calling party in the queue in the order it was received, as shown in program flow block 102. The processor then returns 104 to regular call processing.

A disconnect for terminating the telephone call is carried out according to program flow block 106, wherein the calling party is disconnected, thereby freeing the incoming trunk 14 for serving other calling parties. A return 108 of the call processor 10 is then made to carry on normal call processing. If another destination is desired by the calling party, program flow is branched to block 46, as described above in FIG. 2a. Also, the connection of operator assistance 18 to the calling party, either by the receipt of digit information by the calling party, or through a default route 110, is effected by retrieving the pre-stored extension number and outpulsing the same to the telephone switching system 12. The calling party is thereby connected to the operator assistant 18 in the manner described above. Program control is then returned to block 48 for outpulsing the extension number of the operator assistant 18, as described in detail in U.S. Pat. No. 4,696,028.

Figures 2B, 2F:
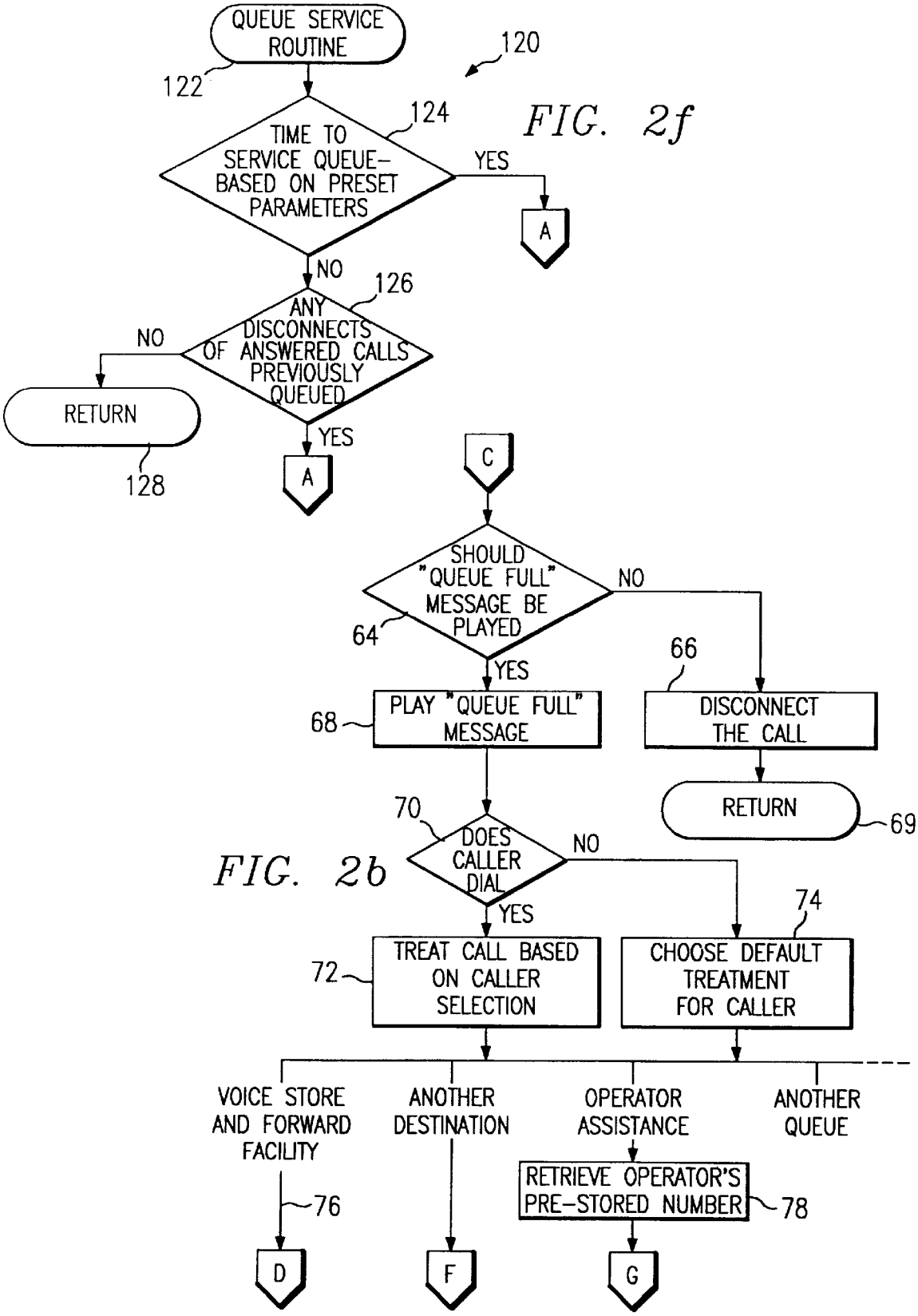
Figure 2D:
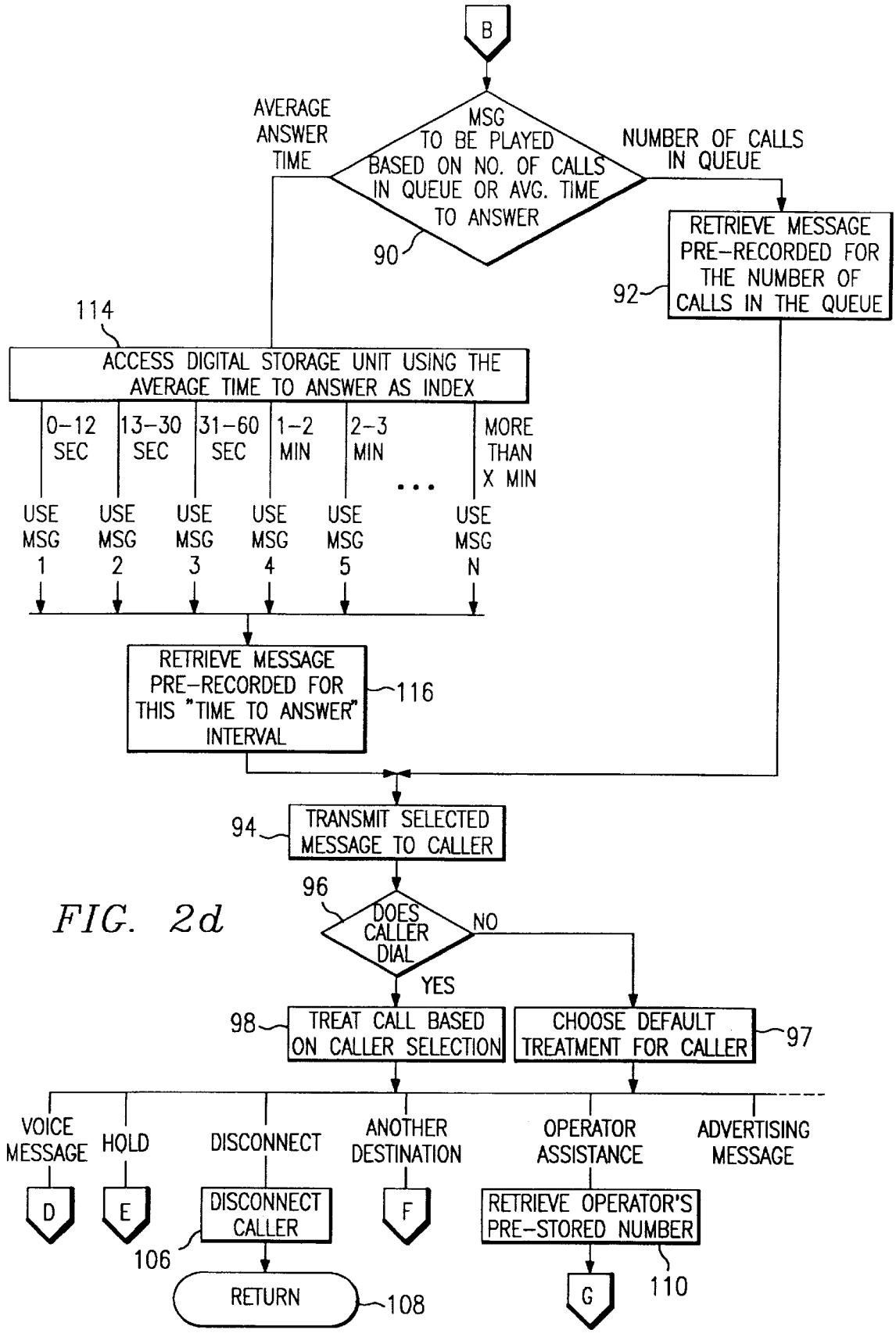

In the event that the call processor 10 has been programmed for transmitting to the calling party the average answer time, the call processor 10 proceeds from program flow block 90 of FIG. 2d to block 114. Here, the call processor 10 utilizes the average wait time calculated according to software routine 58 as an index in a look-up table 36 for accessing a particular message pre-stored in the digital announcement circuit 32. For example, if the average answer time is calculated to be between zero and twelve seconds, a message is retrieved from the digital announcement circuit 32 which apprises the calling party that the average wait time is up to twelve seconds. For other calculated average wait times, various other messages may be retrieved from the digital announcement circuit 32. As further examples, arbitrary time periods of 13–30 seconds, 31–60 seconds, 1–2 minutes, 2–3 minutes, and more than 3 minutes may be employed as time period segments and for accessing the look-up table 36 and retrieving corresponding average answer time messages from the announcement circuit 32 for transmission to the calling parties. Once the average wait time is calculated and correlated to a particular message, such message is retrieved 116 from the announcement circuit 32, and transmitted to the calling party. This action is depicted by program flow block 94. All processing continues as noted above by the flow taken from block 94.

FIG. 2f illustrates an exemplary queue service routine 120 which is periodically executed by the CPU 26 of the call processor 10. The queue service routine 120 is entered via program flow block 122, and is then directed to block 124 where it is determined whether or not the queue should be serviced, based upon preset parameters. One such parameter may include a specified time period. In other words, the CPU 26 periodically scans the status of the queue to determine if further action is required to advance the callers in the queue to expedite call completions. If it is determined that servicing of the queue is required, program control branches back to block 50 where a destination number is transmitted to the switching system. On a negative determination of the decision according to program flow block 124, control branches to another decision block 126 where it is determined whether or not there exists any disconnects of the calling parties which have been answered but which had previously been queued. An affirmative response indicates that an agent may be currently available to receive a call which is presently being queued. If not, call processing returns 128 to the mainline program for continued processing of calls according to the invention. If, on the other hand, a calling party has been disconnected, program control branches back to flow block 50 where a digit transmission is effected to the telephone switching system 12 in an attempt to determine if the general call will now be answered.

From the foregoing, there is disclosed system apparatus and corresponding methods for enhancing call completions to telephone switching system type equipment. An important technical advantage of the invention is the prevention of "ACD jail" by giving the calling parties options to complete telephone calls to alternate destinations, when all service positions are busy. An additional technical advantage presented by the invention is that the queued calling parties are informed of their relative position in the queue, thereby alleviating notions that progress is not being made in completing their calls. An associated technical advantage of the invention is that in determining the number of calls in the queue or the average answer time of calling parties, delay spectra information is automatically generated for management purposes. Yet another technical advantage of the invention is the enforcement of queue limitation, whereby calling parties exceeding a maximum number are not allowed to remain in the queue waiting for traffic service positions to open which thereby block other incoming calls from reaching other available destinations.

While the preferred embodiment of the invention has been disclosed with reference to a specific call processor system and method of call processing, it is to be understood that many changes in detail may be made as a matter of engineering choices without departing from the spirit and scope of the invention, as defined by the appended claims.

What is claimed is:

1. A method for operating a call processor in conjunction with a telecommunication switching system which has no calling party queuing facilities to achieve automatic call distribution functions, comprising the steps of:

receiving by the call processor incoming calls from calling parties, which incoming calls are directed to the switching system;

receiving from the calling parties, by the call processor, destination information;

in response to each respective incoming call, requesting service of the switching system by the call processor;

in response to an acknowledgment of the respective requests for service by the switching system, transmitting by the call processor to the switching system the respective destination information;

determining by the call processor whether any of the respective destinations associated with the destination information are busy or unavailable;

for calling parties unserviced by an attendant, and who had input destination information associated with respective destinations determined by the call processor to be busy or unavailable, placing such unserviced calling parties in a queue; and periodically transmitting destination information by the call processor to the switching system to determine whether or not a respective destination is busy or unavailable, and if a respective destination is available, causing a respective queued calling party to be connected by a speech path through the switching system to the available destination.

2. The method of claim 1, further including queuing in one queue the calling parties inputting destination information defining a common destination.

3. The method of claim 1, further including hook-flash signalling by the call processor to the switching system to request service thereof.

4. The method of claim 1, further including providing off-hook signals by the call processor to the switching system to request service.

5. The method of claim 1, further including forming different calling party queues for different destinations when said calling parties input destination information [association] *associated* with plural busy or unavailable destinations.

6. The method of claim 1, further including analyzing by the call processor the destination information input by the calling parties to determine if the respective call is to a destination in which calling parties should be queued.

7. The method of claim 1, further including transmitting to the queued calling parties a message to input dialed information for disconnection from the queue, and in response to the input of the dialed information by a queued calling party, the call processor disconnects the calling party from the queue.

8. The method of claim 1, further including transmitting to the calling parties a message to input dialed information for placing a calling party on hold, and in response to the dialed information the call processor places the calling party inputting the dialed information in a queue.

*9. A method for operating a telecommunication system comprising a call processor in conjunction with the telecommunication system, comprising the steps of:*

*configuring said call processor to process incoming calls from a plurality of calling parties, which incoming calls are directed to a switching system;*

*receiving from said calling parties, by said call processor, destination information;*

*configuring said switching system to identify to said call processor whether any of respective destinations associated with the destination information received from said calling parties are available;*

*for any of said calling parties unserviced by an attendant and who had input destination information associated with a respective destination determined by said call processor to not have an attendant available at that time, forming at least one calling party queue for each respective destination and placing any unserviced calling party in said at least one queue of said respective destination associated with said destination information input by said any unserviced calling party; and*

*periodically transmitting destination information by said call processor to said switching system to determine whether or not said respective destinations associated with said destination information input by said any unserviced calling parties are available, and if available, causing said respective queued unserviced calling parties to be connected to the available respective destinations, and if unavailable, causing at least one message relating to a parameter of said at least one queue to be transmitted to said respective queued calling parties, wherein said at least one message may be different for each of said respective queued unserviced calling parties.*

*10. The method of claim 9, wherein said at least one message relating to a parameter of said at least one queue comprises a wait time the respective queued unserviced calling party has in said at least one queue before being connected to said respective destinations.*

*11. The method of claim 9, wherein said at least one message relating to a parameter of said at least one queue comprises information referring to the respective queued unserviced calling party's position in said at least one queue relative to said respective destinations.*

*12. A method for operating a telecommunication system comprising a call processor in conjunction with a switching system for allowing said switching system to process incoming telephone calls for connection to one of a plurality of destinations to which calling parties can be queued before being connected thereto, comprising the steps of:*

*receiving by said telecommunication system incoming calls from calling parties, wherein each of said incoming calls are directed to at least one desired destination of said plurality of destinations selected by each of said calling parties;*

*forming different calling party queues associated with said plurality of destinations;*

*determining by said telecommunication system whether said selected at least one desired destination is available;*

*for each of said incoming calls from calling parties trying to reach said selected at least one desired destination which are determined by said telecommunication system to not be available at that time, placing such unserviced incoming calls in one of said queues associated with said selected at least one desired destination;*

*calculating a busy status parameter for each of said incoming telephone calls which are queued in said queues;*

*transmitting at least one message to a said respective one of calling parties associated with said unserviced incoming calls in said queues, said at least one message having a content related to said busy status parameter.*

* * * * *